United States Patent [19]
Heuer et al.

[11] Patent Number: 6,067,776
[45] Date of Patent: May 30, 2000

[54] METHOD FOR PACKAGING THERMOPLASTIC COMPOSITIONS COMPRISING SUFFICIENTLY COOLING COMPOSITION

[75] Inventors: Glenn C. Heuer; Norris R. Brand, both of Forest Lake; Randall D. Nelson, East Bethel, all of Minn.; Wolfgang Weber, Luneburg, Germany

[73] Assignee: H. B. Fuller Licensing & Financing, Inc., St. Paul, Minn.

[21] Appl. No.: 09/069,504

[22] Filed: Apr. 29, 1998

[51] Int. Cl.⁷ ...................................................... B65B 63/08
[52] U.S. Cl. ................................................. 53/440; 53/435
[58] Field of Search ........................... 53/440, 127, 435; 264/210.2, 211.12, 212

[56] References Cited

U.S. PATENT DOCUMENTS

| | | |
|---|---|---|
| 3,851,438 | 12/1974 | Brisman .................................. 53/440 X |
| 4,259,220 | 3/1981 | Bunnelle et al. . |
| 4,748,796 | 6/1988 | Viel ....................................... 53/440 X |
| 5,257,491 | 11/1993 | Rouyer et al. ......................... 53/440 X |
| 5,359,006 | 10/1994 | Kulzick et al. . |
| 5,669,207 | 9/1997 | Hull ........................................... 53/440 |
| 5,819,505 | 10/1998 | Fayolle et al. ............................ 53/440 |

*Primary Examiner*—Linda Johnson
*Attorney, Agent, or Firm*—Nancy N. Quan

[57] ABSTRACT

The present invention is directed to a method of packaging thermoplastic compositions. Preferably, the steps of the method may be employed in a continuous process. The method is especially suited for thermoplastic compositions such as pressure sensitive hot melt adhesives. The pressure sensitive thermoplastic composition may be packaged in an inclusion meltable film material wherein the film can be melted and blended with the hot melt adhesive during use, or alternatively, the composition may be contained in a drum. Alternatively the thermoplastic composition may be coated with a pelletizing aid.

22 Claims, 6 Drawing Sheets

METHOD FOR PACKAGING THERMOPLASTIC COMPOSITIONS COMPRISING SUFFICIENTLY COOLING COMPOSITION

FIELD OF THE INVENTION

The present invention relates to a method for packaging thermoplastic compositions, particularly hot melt adhesive compositions. More specifically, it relates to a method for continuously packaging thermoplastic compositions by means of forming a plurality of individual pieces of a thermoplastic composition and sufficiently cooling the thermoplastic composition such that the surface is sufficiently detackified.

DESCRIPTION OF THE ART

Hot melt adhesives (HMA's) are solid at room temperature and are generally applied to a substrate while in a molten state. Hot melt adhesives can be characterized into two types, hot melt pressure sensitive adhesives (HMPSA's) which are tacky to the touch even after the adhesive has solidified and non-tacky hot melt adhesives which will be denoted as simply HMA's. HMA's have been packaged in a variety of forms ranging from small pellets which can be vacuum fed into a melting device, to drum sized quantities. With the exception of adhesive compositions having an ingredient in a supercooled state, the packaging of HMA's has typically been unproblematic, since after the adhesive is solidified, it will maintain its shape and not adhere to the container, other pieces of hot melt, the operator's hands, machinery, etc. until remelted. Underwater pelletizing devices as well as stripforming or rotoforming HMA's onto a cooled belt has been used extensively for packaging these types of products.

HMPSA's on the other hand, present a variety of challenges. Historically, these adhesives are provided in the form of blocks and because of the nature of these materials, there are problems associated with handling and packaging them. The solid HMPSA blocks not only stick to each other and adhere to the operator's hands and mechanical handling devices, but they also pick up dirt and other contaminants. Additionally, certain high tack formulations result in blocks that will deform or cold flow unless supported during shipment. The needs and advantages for providing tackless or nonblocking hot melt pressure sensitive adhesive forms or packages are apparent and various ways of accomplishing this have been developed.

EP 0115307, published Jan. 1, 1984, relates to contacting a stream of molten adhesive with a polymeric dispersion.

In German patent 22 48 046, the hot melt adhesive is squeeze-cut into pillow-shaped pieces, the pieces subsequently cooled and solidified. For pressure sensitive adhesives that are manufactured with this method, it is known to coextrude a non-tacky coating on the exterior of the pillow to prevent the individual pillow-shaped pieces from subsequently blocking together.

Rouyer et al., U.S. Pat. No. 5,257,491 teaches a method of packaging an adhesive composition by surrounding the adhesive with a plastic packaging material having characteristics which are compatible with and do not substantially adversely affect the adhesive characteristics of the packaged adhesive.

Collectively, German patent 22 48 046, and embodiments of U.S. Pat. No. 5,257,491 have been used successfully in the industry.

Patent application U.S. Pat. No. 5,715,654, issued Jun. 7, 1995, is directed towards a continuous process of packaging thermoplastic compositions by dispensing thermoplastic compositions into thermally conductive molds wherein the resulting adhesive mass is of certain dimensions such that the mass can be sufficiently cooled in the presence of ambient air.

All these methods described above are better suited to packaging smaller amounts of pressure-sensitive adhesives or other thermoplastic. Continuous packaging of larger amounts using the above methods are less efficient since extended cooling times are needed due to such materials exhibiting poor thermal conductivity.

Accordingly, it would be a significant advantage to the industry to have a method of continuously packaging thermoplastic compositions, especially pressure-sensitive adhesives, that not only does not require the use of non-tacky coatings but also eliminates the production inefficiencies caused by extended cooling times.

SUMMARY NO THE INVENTION

The present invention is directed to a method of packaging thermoplastic compositions. Preferably, the steps of the method may be employed in a continuous process. The method is especially suited for thermoplastic compositions such as pressure sensitive hot melt adhesives. The pressure sensitive thermoplastic composition may be packaged in an inclusion meltable film material wherein the film can be melted and blended with the hot melt adhesive during use, or alternatively, the composition may be contained in a drum. Alternatively the thermoplastic composition may be coated with a pelletizing aid. The method comprises the steps of:

a) forming a plurality of individual pieces of a pressure sensitive thermoplastic composition;

b) contacting said pieces of pressure sensitive thermoplastic composition with a cooling medium until said thermoplastic composition is sufficiently detackified; and c) conveying said thermoplastic composition into an enclosure.

The individual pieces of pressure sensitive adhesive may be formed into pieces by a variety of processes such as rotoforming, stripforming, dropforming, spraying, extruding or underwater type pelletizing. In the case of underwater type pelletizing, it should be noted that water alone is not surmised to be a sufficient coolant for larger amounts of pressure sensitive thermoplastics. The cooling medium can be an ionic solution, a liquid refrigerant or refrigerant gas, as the thermoplastic composition temperature must be cooled to about 0° C. or less, for the majority of HMPSA's pieces to become sufficiently detackified.

In another embodiment, the present invention is a method of packaging a thermoplastic composition comprising the steps of:

a) forming a plurality of individual pieces of a thermoplastic composition;

b) dispensing said pieces of thermoplastic composition into a column of gas;

c) allowing the pieces to pass through the gas column until sufficiently cooled;

d) dispensing said thermoplastic composition into an enclosure.

A sufficiently low gas temperature in combination with a sufficient column length is needed such that the individual pieces are sufficiently cooled by the time the pieces reach the opposite end of the column. In this embodiment, sub-zero gas temperatures need not be employed for pressure sensitive thermoplastic materials, provided a dusting agent to further detackify the material is employed.

In another embodiment, the present invention is a method of packaging a thermoplastic composition comprising the steps of:

a) forming a plurality of individual pieces of thermoplastic composition;

b) dispensing said pieces of thermoplastic composition into a refrigerant;

c) retaining said pieces in said refrigerant until sufficiently detackified;

d) removing said pieces from said refrigerant; and e) dispensing said pieces into an enclosure.

The extent of cooling necessary to detackify each thermoplastic composition is a function of the rheological properties of the thermoplastic composition to be packaged. In the case where the composition is of the desired size prior to cooling, the thermoplastic composition is cooled to a temperature where the shear storage modulus is about $1 \times 10^8$ dynes/cm$^2$ or greater. However, in the case where the thermoplastic composition is larger than the final desired size, as in the case when a ⅛" sheet of adhesive is extruded onto a cooled belt, the thermoplastic composition needs to be cooled to a temperature wherein the shear storage modulus is significantly higher than $1 \times 10^8$ dynes/cm$^2$, for example, at least about $1 \times 10^9$ dynes/cm$^2$ in order that larger pieces can be easily segmented into smaller pieces after cooling.

DETAILED DESCRIPTION OF THE DRAWINGS

Figure 1:
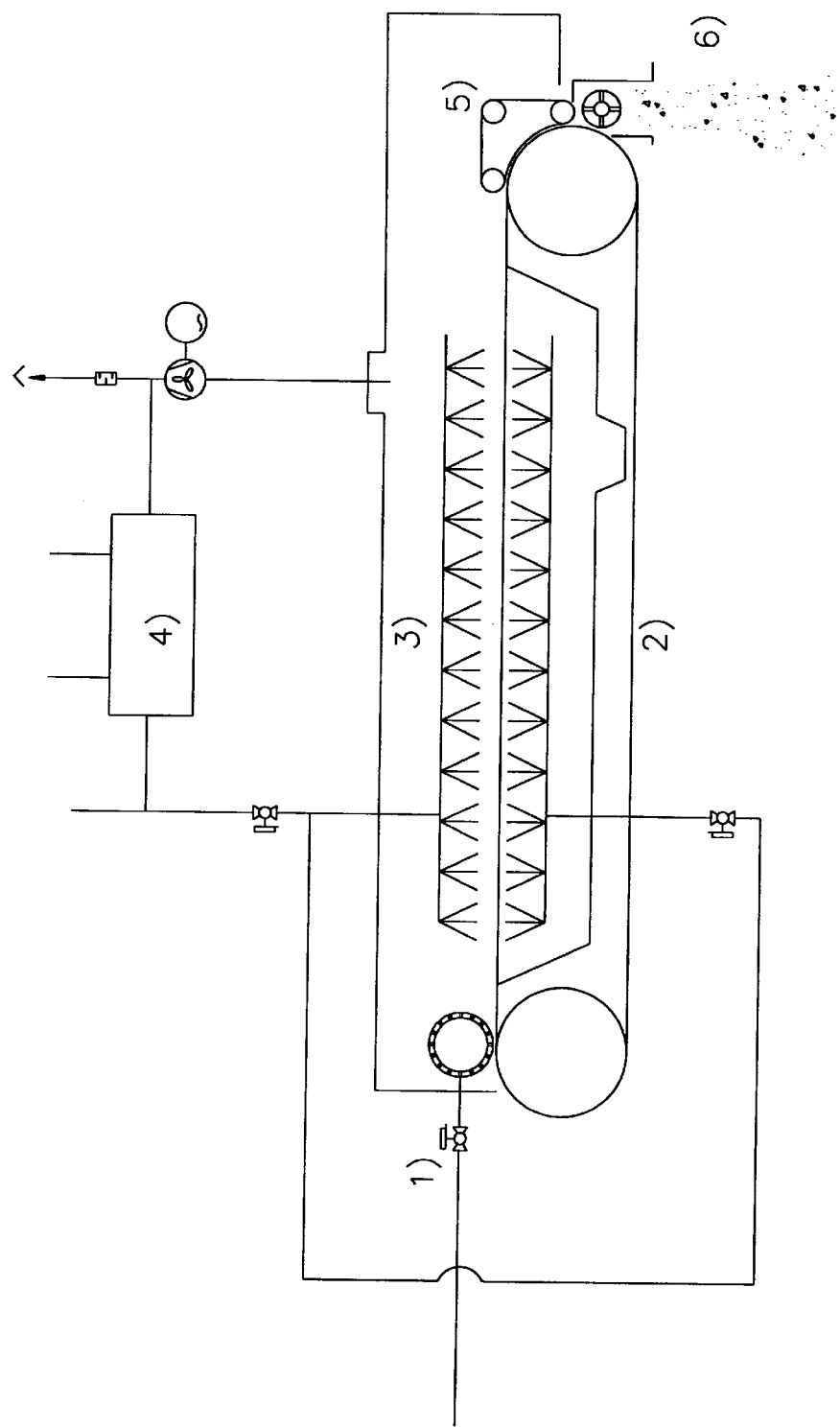
FIGS. 1–3 exhibit three preferred embodiments of the method of the present invention. The first embodiment, FIG. 1, employs dispensing the thermoplastic composition onto a cooled belt. The second embodiment, FIG. 2, employs forming and dispensing a thermoplastic composition within a cooled gas column. The third embodiment, FIG. 3, employs forming and dispensing the thermoplastic composition directly into a refrigerant cooling medium.
Figure 3:
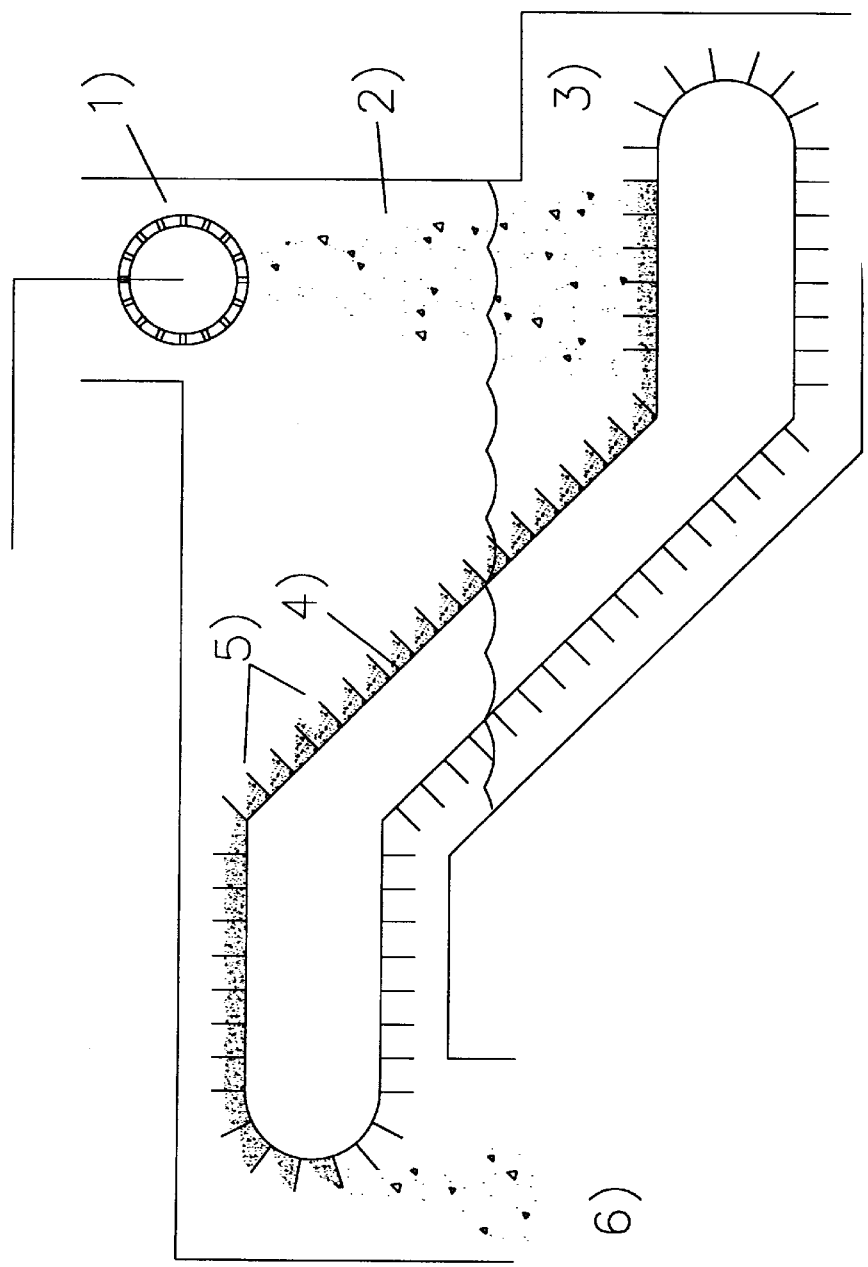

In an embodiment depicted in FIG. 1, the molten pressure sensitive thermoplastic composition exits the forming device (1) onto a continuous belt (2). Preferably, the belt material comprises thermally conductive material such as various metals including copper, stainless steel, and aluminum. The invention also contemplates the use of belt materials having a conductive material disposed within a non-conductive material. It is also advantageous to coat the belt surface with Teflon® to minimize the tendency of the thermoplastic composition to adhere to the belt. The cooling medium is preferably in the form of a gaseous chamber having coolant jets (3) releasing cooled gas onto the surface of the pressure sensitive thermoplastic composition. Preferably, the belt is also cooled beneath by additional coolant jets or alternatively by a recirculating liquid refrigerant. The cooled gas may be recycled with a heat exchanger (4) or other recycling means. Preferably, the continuous belt is of sufficient length that the surface of the HMPSA pieces sufficiently detackified such that the pieces can be conveyed directly into a container. Alternatively, the belt may be shorter in length when the pieces of pressure sensitive thermoplastic composition are conveyed into a liquid refrigerant bath, as depicted in FIG. 3, for additional cooling. In the case of the stripformed pieces, wherein a continuous bead or strand of thermoplastic composition is formed on the belt, a cutting chamber (5) is positioned prior to the container filling station (6). This embodiment also contemplates extruding a continuous sheet of a thermoplastic composition onto the belt and breaking the sheet into pieces after sufficient cooling.

Figure 2:
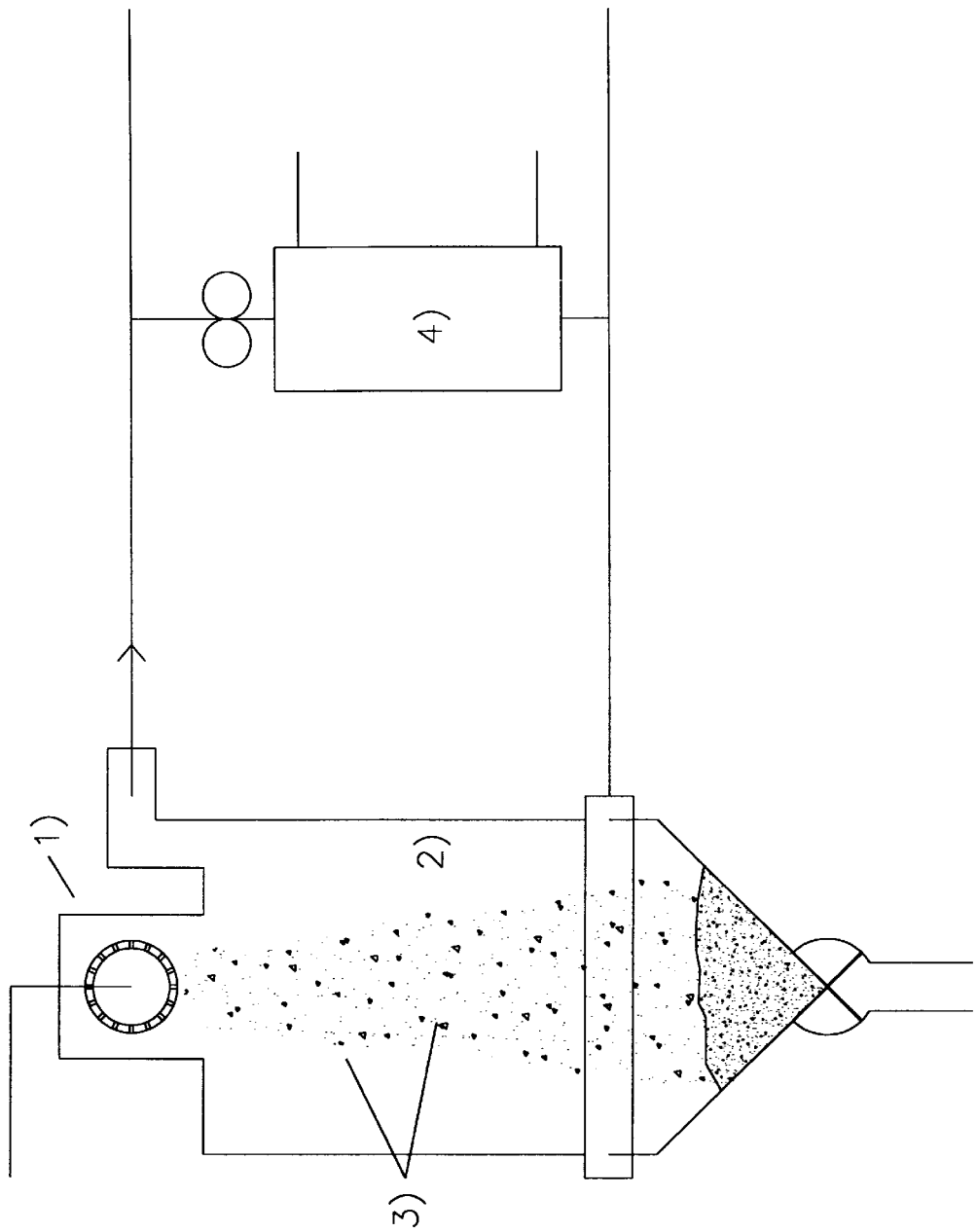

In an embodiment depicted in FIG. 2, the molten thermoplastic composition exits the forming means (1) and the individual pieces are dispensed into a column of cooled gas. The length of the column and temperature of the cooled gas (2) is a function of both the size of the pieces (3) and the shear storage modulus (G') of the thermoplastic composition, as will be demonstrated in the forthcoming examples. As in FIG. 1, a heat exchanger (4) or other gas recycling means is preferably employed to recycle the coolant. Preferably, the column is positioned substantially vertically such that gravitational acceleration causes the thermoplastic pieces to descend through the column. Alternatively, the column may be positioned substantially horizontally. In this embodiment, the thermoplastic pieces may be conveyed to the opposite end of the column by means of a moving fluid (gas or liquid).

In an embodiment depicted in FIG. 3, the molten pressure sensitive thermoplastic composition exits the forming device (1) and the individual pieces (2) are dispensed into a liquid refrigerant bath (3) which is preferably positioned below or adjacent to the forming device. The thermoplastic pieces are retained in the liquid refrigerant until sufficiently cooled or sufficiently detackified. The cooled pieces are then removed from the bath by mechanical means (4) having undulations (5) to collect the detackified thermoplastic composition. The pieces of thermoplastic composition are then conveyed to a filling station (6) where the adhesive pieces are fed into a container.

Alternatively, the molten pressure sensitive thermoplastic composition is fed from a holding tank through a series of pipes to a die having a series of holes, typically in a circular pattern. The die is positioned such that the holes exit into a chamber filled with a liquid refrigerant. As the molten composition emerges from the die, it is cut into pellets in the cutting chamber by rotating blades. The pellets are retained in the liquid refrigerant for a sufficient amount of time until the surface of the pellets are essentially non-tacky. Depending on their density relative to the liquid refrigerant, the density of the thermoplastic composition causes the pellets to float or sink. The pellets are then removed from the liquid refrigerant and dispensed into a container. The components of underwater pelletizing systems, such as those available from Gala Industries Inc., Eagle Rock, Va., can be adapted to the method of the present invention.

The invention also contemplates combining the basic features of each of the embodiments depicted in various configurations.

DETAILED DESCRIPTION OF THE INVENTION

The molten thermoplastic composition, such as a pressure sensitive hot melt adhesive, is generally poured or pumped into a forming device at a temperature at which the molten thermoplastic composition exhibits a Brookfield® viscosity ranging from about 100 to about 200,000 cPs, preferably from about 10,000 to about 50,000 cPs. At viscosities below about 1,000 cPs, the thermoplastic composition tends to be too fluid to retain its shape for drop forming techniques. At viscosities greater than about 50,000 cPs, excessive pump pressures would be required. This temperature will generally vary from about 90° C. to about 175° C., preferably from about 110° C. to about 150° C., particularly in the case of HMPSA's. All suitable forming devices are contemplated by the invention including spray heads, rotoformers, stripformers, slot nozzles, extruders, dropformers, underwater type pelletizers, etc. Preferably, forming devices are employed which result in the thermoplastic composition being of the desired size prior to cooling. In this embodiment, the shortest dimension of a three-dimensional piece of thermoplastic composition ranges in size from about 0.5 mm to about 50 mm in diameter, and preferably ranges in size from about to 0.5 mm to 10 mm. It is advantageous to employ relatively small pieces of thermoplastic composition in the method of the present invention to improve efficiencies. Substantially spherical shaped pieces are preferred. However, elliptical, pastille shaped, tear drop shaped, and flakes are also contemplated, particularly in the case wherein larger pieces are first formed and then subsequently segmented.

Alternatively, the thermoplastic composition may be dispensed molten at a dimension larger than desired by means such as a stripformer, extruder, and slot nozzle. In this embodiment the formed pieces are preferably segmented after sufficient cooling. After forming the thermoplastic compositions into a strip, sheet, or individual piece, the thermoplastic composition is placed in contact with a cooling medium. Depending on the extent of cooling employed, the pieces of thermoplastic composition may be subsequently reduced in size by means of a cutter blade, rotary cutter, grinders, crushers, breaker bar or other means.

The cooling medium may be any liquid, gas, or solution capable of maintaining sub-zero (° C.) temperatures without undergoing a phase change. Liquid or gaseous nitrogen, compressed carbon dioxide and the like are suitable coolants for this purpose. Preferably, the cooling medium is provided as a refrigerant bath or other refrigerant means such as chilled glycol, liquid or gaseous nitrogen, compressed carbon dioxide or the like, as well as certain aqueous electrolyte solutions wherein the freezing point is sufficiently below that of the temperature to which the composition is to be cooled.

The materials of the apparatus will be chosen to insure that all surfaces in contact with the cooling medium are able to sustain temperatures ranging from about $-45°$ C. to about $0°$ C., preferably from about $-30°$ C. to about $0°$ C., and more preferably from about $-20°$ C. to about $0°$ C.

Pelletizing aids may be optionally employed in the method of the present invention. Pelletizing aids include slip agents, anti-static agents as well as antiblocking agents that prevent the pellets from sticking together and blocking into clumps. Accordingly, materials such as talc, high melt point tackifying resins, as well as a wide variety of waxes may be added. The coating of such pelletizing aid onto the thermoplastic pieces may be in the form of an aqueous solution or emulsion, a dry powder, or any combinations of such, including the two-step method described in WO 97/12695, published Apr. 10, 1997.

The thermoplastic composition is either temporarily detackified, or, in the case where the method of the present invention is employed with non pressure sensitive materials or a detackifying ingredient is additionally employed, the surface of the pieces of thermoplastic composition may be permanently detackified until remelted by the end users. In the instance where the composition is pressure sensitive and only detackified by means of temperature, the composition is preferably conveyed into a drum or a packaging film which is meltable and blendable with the thermoplastic composition. Information concerning packaging adhesives in film materials which need not be removed prior to use is the subject matter of Rouyer et al, U.S. Pat. No. 5,257,491, issued Nov. 2, 1993 (EP equivalent 0 748 673 A2, published Dec. 18, 1996) incorporated herein by reference.

The method of the present invention is particularly useful for packaging compositions which are pressure sensitive in nature such as HMPSA's as well as those compositions comprising a super-cooled ingredient. A super-cooled ingredient is a liquid which is cooled below a transition temperature without the transition occurring. One particular hot melt adhesive ingredient which is known to have this property when properly combined with other ingredients is cyclohexane dimethanol dibenzoate plasticizer sold under the tradename Benzoflex® 352 available from Velsicol Chemical Corporation, Rosemont, Ill. Further information concerning adhesive compositions exhibiting controlled or delayed crystallinity may be found in U.S. Pat. No. 5,624,986 issued Apr. 29, 1997, incorporated herein by reference.

HMPSA's are generally characterized according to the Dahlquist criteria, which defines pressure sensitive adhesive behavior according to temperature and rate dependent viscoelastic properties. Broadly speaking, pressure sensitive compositions have a plateau shear storage modulus (G') between about $1\times10^5$ dynes/cm$^2$ and about $4\times10^6$ dynes/cm$^2$ at 25° C. and 1 radian/sec, and preferably between about $3\times10^5$ dynes/cm$^2$ and about $1\times10^6$ dynes/cm$^2$. A stiffer material, for example a material having a plateau shear modulus greater than about $1\times10^7$ dynes/cm$^2$, is relatively noncompliant and does not exhibit surface tackiness at room temperature.

Additionally, HMPSA's typically have glass transition temperatures (Tg) ranging from about $-45°$ C. to about $30°$ C., preferably from about $-20°$ C. to about $25°$ C. as measured by the tan δ peak temperature at 10 radian per second, as determined by Dynamic Mechanical Analysis (DMS).

Figure 4:
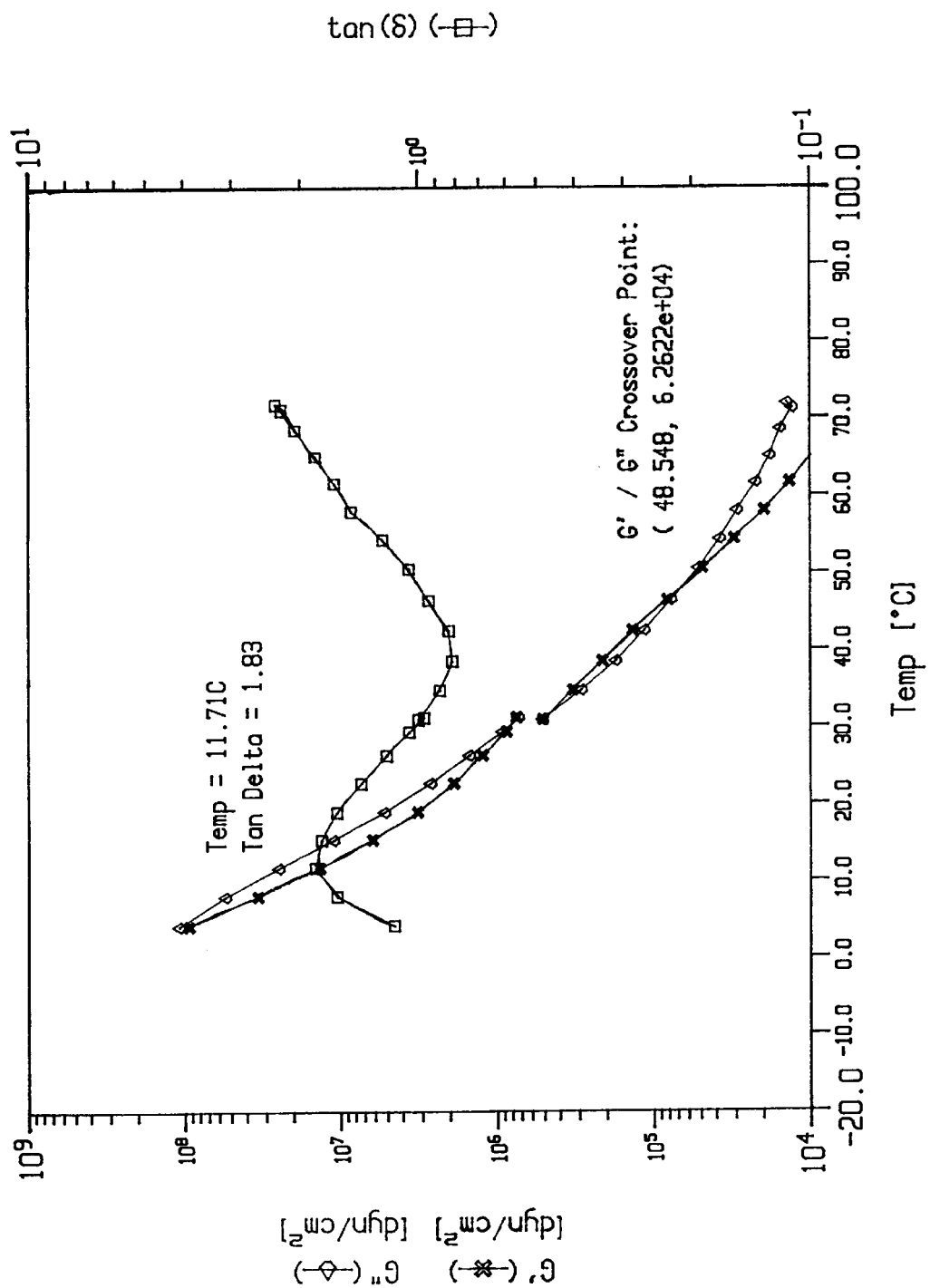
FIGS. 4–6 exhibit temperature sweeps for three representative hot melt pressure sensitive adhesives.
Figure 5:
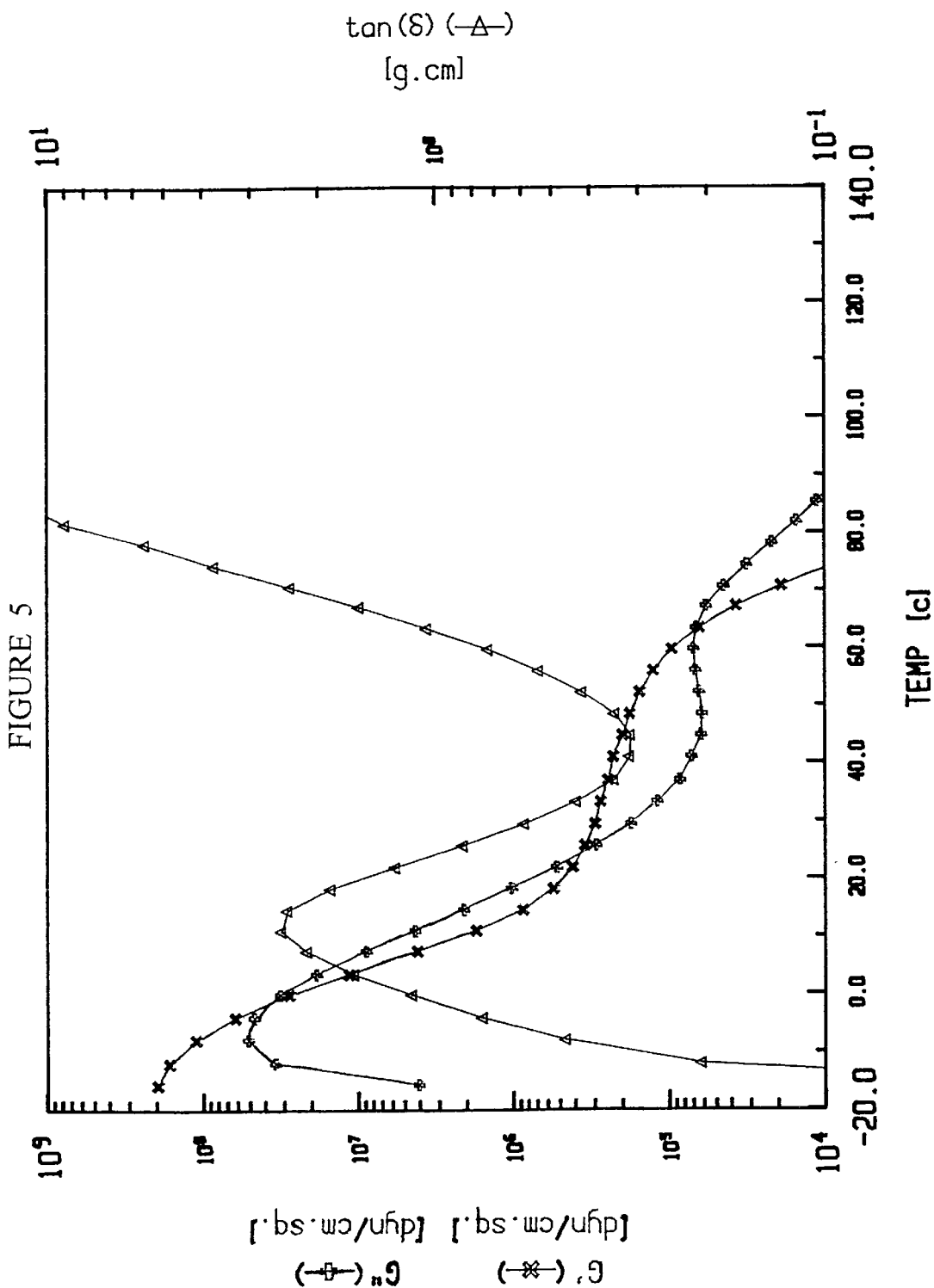
Figure 6:
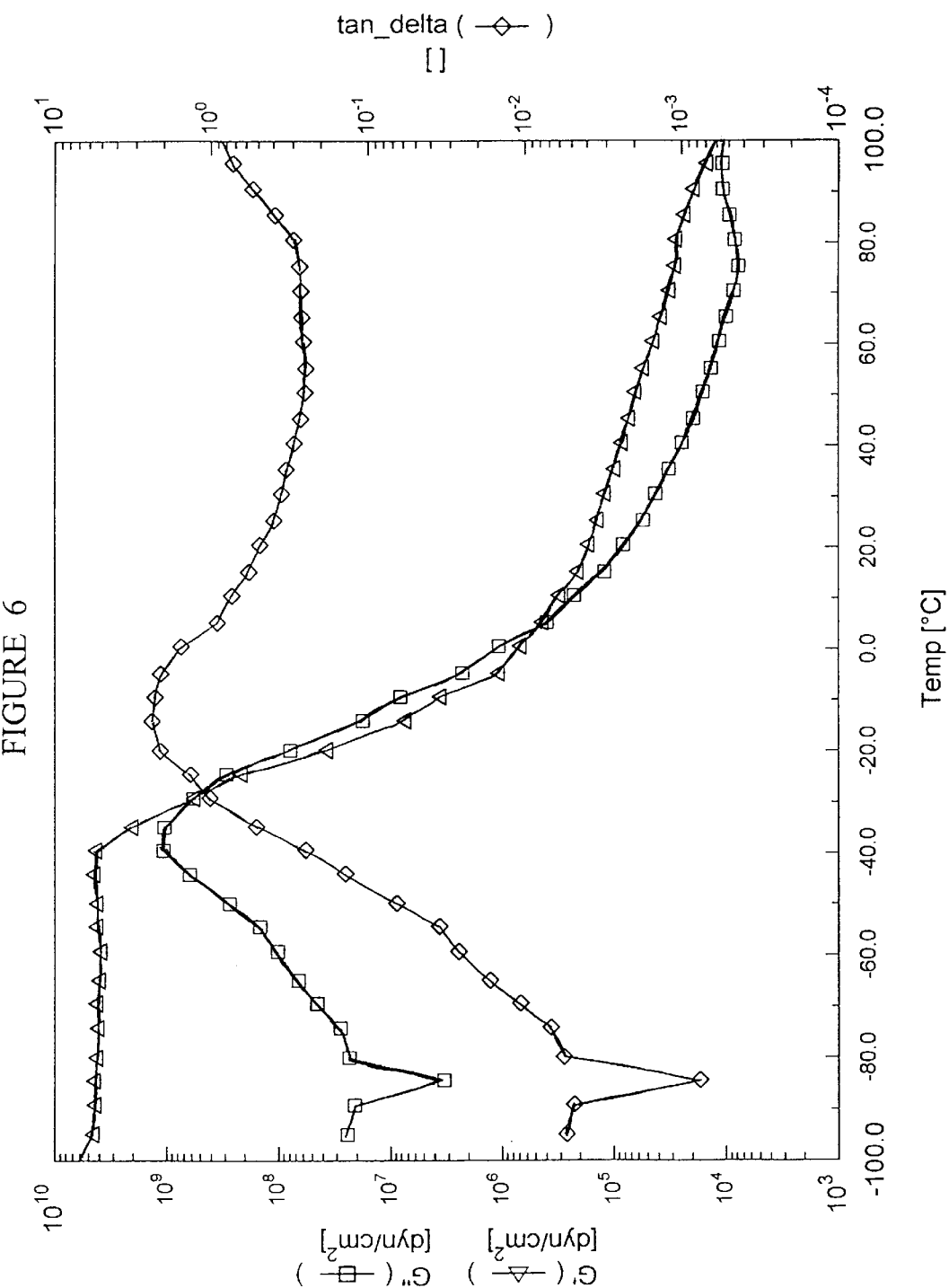

FIGS. 4–6 are temperature sweeps for three representative HMPSA's. The shear storage modulus (G'), loss modulus (G"), and tan delta were obtained by testing the adhesives in accordance with ASTM-D440 version 9.3. The extent a HMPSA is cooled in the method of the present invention is a function of the DMS properties of the particular adhesive being packaged. In general, the adhesive composition needs to be cooled to a temperature wherein the plateau shear modulus for the adhesive composition is greater than about $1\times10^7$ dynes/cm$^2$, preferably about $1\times10^8$ dynes/cm$^2$ or greater. Additionally, the rate of cooling is a function of the difference in temperature between the cooling medium and the initial temperature of the flowable thermoplastic composition, the size of the mass being cooled as well as other thermodynamic properties.

The method of the present invention is adaptable to the packaging of virtually any type of thermoplastic composition, including biodegradable materials. It is especially adapted to the packaging of thermoplastic or thermosetting pressure sensitive compositions such as hot melt pressure sensitive adhesives where the handling problems are most severe. The method disclosed herein may be used to package hot melt adhesive compositions prepared from polymers and copolymers of synthetic resins, rubbers, polyethylene, polypropylene, polyurethane, acrylics, vinyl acetate, ethylene vinyl acetate and polyvinyl alcohol. More specific examples include hot melt adhesives prepared from the following:

a) rubber polymers such as block copolymers of monovinyl aromatic hydrocarbons and conjugated dienes, e.g., styrene-butadiene, styrene-butadiene-styrene, styrene-isoprene-styrene, styrene-ethylene-butylene-styrene, and styrene-ethylene propylene-styrene;

b) ethylene-vinyl acetate polymers, other ethylene esters and copolymers, e.g., ethylene methacrylate, ethylene n-butyl acrylate and ethylene acrylic acid;

c) polyolefins such as polyethylene and polypropylene, poly α-olefins including metallocene poly α-olefins;

d) polyvinyl acetate and random copolymers thereof;

e) polyacrylates;

f) polyamides;

g) polyesters;

h) polyvinyl alcohols and copolymers thereof;

i) polyurethanes;

j) polystyrenes;

k) polyepoxides;

l) graft copolymers of vinyl monomers and polyalkylene oxide polymers and;

m) aldehyde containing resins such as phenol-aldehyde, urea-aldehyde, melamine-aldehyde and the like.

The method of the present invention is also useful for water sensitive thermoplastic materials, provided that an aqueous solution is not employed as the cooling medium. Water sensitive thermoplastic materials are gaining wider acceptance as companies desire to manufacture compostable, recyclable, flushable and biodegradable disposable products. Accordingly, the need for packages which are easily handled and efficiently produced of such materials is also becoming increasingly important.

Water sensitivity is incorporated into disposable products with the use of various hydrophilic, water soluble, and water dispersible materials, some of which are truly thermoplastic while others are thermally stable additives and modifiers. Such water sensitive thermoplastic materials may be present as polymers, tackifiers, plasticizers, fillers, etc., alone or in combination with other hydrophobic or hydrophilic materials. Water sensitive materials include water soluble polyamides, polyethyloxazaline (PEOX), polyvinyl pyrrolidone (PVP), polyvinyl pyrrolidone (PVP/VA), polyvinyl alcohol (PVOH), polyesters such as those manufactured by Eastman Chemical Company under the tradename Eastman AQ®, polyvinyl methyl ether, as well as starch and cellulosic esters.

Water sensitive thermoplastic materials are useful as raw materials in a variety of applications such as, but not limited to, the manufacture of nonwovens, elastomeric materials, adhesives, food containers, as well as for producing breathable, biodegradable, and moisture-impermeable barrier films.

The present invention provides an economical packaging method which allows convenient handling for all such materials for any use and is not limited to the packaging of hot melt adhesives.

Most often such adhesives are formulated with tackifying resins in order to improve adhesion and introduce tack into the adhesive. Such resins include, among other materials, a) natural and modified resins, b) polyterpene resins, c) phenolic modified hydrocarbon resins, d) coumarone-indene resins, e) aliphatic and aromatic petroleum hydrocarbon resins, f) phthalate esters and g) hydrogenated hydrocarbons, hydrogenated rosins, and hydrogenated rosin esters.

Desirable optional ingredients include plasticizing diluents, e.g., liquid polybutene or polypropylene, polyethylene greases, hydrogenated animal, fish and vegetable fats, mineral oil and hydrocarbon oils such as naphthenic or paraffinic mineral oils. Petroleum waxes such as paraffin, microcrystalline waxes and synthetic waxes are also employed, particularly in the case of HMAs.

Other optional additives may include stabilizers, antioxidants, colorants and fillers. The selection of components and amounts, as well as the preparation thereof, are well known in the art and described in the literature.

The method is further illustrated by the following non-limiting examples.

HL-1617-X, a metallocene polyolefin based HMPSA commercially available from H.B. Fuller Company, St. Paul, Minn. having the rheological properties depicted in FIG. 4, was tested to determine the temperature at which this adhesive will no longer adhere to itself. Based on these findings, it was determined that an individual piece of this metallocene polyolefin based I IMPSA must be cooled to a temperature below about 0° C. in order to prevent colliding adhesive pieces from sticking together and agglomerating into clumps. At a surface temperature of about 0° C., this adhesive has a shear storage modulus of about $1 \times 10^8$ dynes/$cm^2$. The shear storage modulus correlates to the relative stiffness or compliance of the adhesive.

The metallocene based adhesive depicted in FIG. 4 is dropformed, rotoformed or sprayed into a column as depicted in FIG. 2. The column contains a refrigerant gas such as nitrogen having a temperature of about –100° F. The initial temperature of the thermoplastic composition upon exiting the adhesive forming device is about 250° F. and the forming device produces a substantially spherical ⅛" adhesive pellet. At a 10 ft/sec counter flow velocity, the column has a length of about 130 ft to insure the surface of the pellet reaches the desired temperature. By increasing the counter flow velocity to 20 ft/sec the column length is reduced to about 40 ft in length. For typical commercial production rates of about 5000 lbs. per hour, employing about a 20 ft/sec gas counter flow velocity, a column having a diameter of about 10 ft and a length of about 40 ft is preferred. These efficiencies are doubled to about 11,000 lbs/hour by employing a column having a diameter of 15 ft.

In the case of smaller pellets, a lower counter flow velocity is employed in combination with the same length column exemplified for the ⅛" pellets. Alternatively, upon maintaining the same counter flow velocities as described for the ⅛" pellet, the column length is reduced. For example, in the case of substantially spherical ¹⁄₁₆" pellets at production rates of about 5000 lbs/hour, assuming once again a –100° F. refrigerant gas temperature, a 2.5 ft/sec. counter flow velocity is employed with a 10 ft. diameter column having a height of 50 ft.

The same metallocene based adhesive depicted in FIG. 4 is continuously processed into pellets in accordance with the embodiment depicted in FIG. 1. For this embodiment, particularly in the case of stripforming or sheetforming, it is surmised that the adhesive must be cooled to a temperature in which the adhesive is friable. A target temperature for this method was determined to be –15° F. A 48" sheet of adhesive is cast or extruded onto a 60" width belt having a length of about 60 ft wherein the belt temperature is cooled to about –50° F. The initial temperature of the molten adhesive is about 250° F. and the center of the adhesive sheet reaches the target temperature by the time it reaches the end of the belt at a production rate of about 2500 lbs/hr.

This same metallocene based adhesive is processed in accordance with the embodiment depicted in FIG. 3. In this embodiment, a substantially spherical shaped pellet is rotoformed above a liquid nitrogen containing vessel. A ¼" pellet is maintained in the fluid for about 7 seconds to reach the target temperature of about 0° C. The residence time is controlled by the belt speed. For a 5000 lbs/hour continuous process, a chain or screen belt about 4 ft wide and about 7 ft in length traveling at about 1 ft/sec. is employed.

HL-1280-X, a block copolymer based hot melt pressure sensitive adhesive, also commercially available from H.B. Fuller Company, having the rheological properties depicted in FIG. 5, must be cooled to a temperature ranging from about −5° C. to about 0° C. in order to reach a temperature wherein the shear storage modulus is about $1 \times 10^8$ dynes/cm² or greater.

FIG. 6 depicts HL-1439-X, a hot melt pressure sensitive adhesive commercially available from H.B. Fuller Company based on a high molecular weight (Mw) styrene-ethylene/butylene-styrene block copolymer. Compositions of this type are the subject matter of U.S. Pat. No. 5,459,193 issued Oct. 17, 1995 to Anderson et al., incorporated herein by reference. This adhesive composition must be cooled to a temperature of about −20° C. or less in order to reach a temperature wherein the shear storage modulus is about $1 \times 10^8$ dynes/cm² or greater. In the case of embodiments where it is desired to crush or break larger portions of the adhesive into the desired size, this adhesive composition must be cooled to about −30° C. or less in order that the shear storage modulus be about $1 \times 10^9$ dynes/cm² or greater. With respect to the metallocene polyolefin based adhesive described above, cooler temperatures can be achieved by various means such as reducing the coolant temperature, reducing the size of the individual portions of adhesive, increasing the amount of time the thermoplastic composition is in contact with the coolant such as by increasing the counter flow velocity, increasing the residence time and/or increasing the column height.

What is claimed is:

1. A method for continuously packaging a thermoplastic composition comprising the steps of:
    a) forming a plurality of individual pieces of a molten thermoplastic composition in a forming device;
    b) dispensing said pieces of thermoplastic composition into a column of cooled gas,
    c) allowing the pieces to fall through the column until sufficiently cooled;
    d) dispensing said thermoplastic composition pieces into an enclosure; and
    e) recycling the cooled gas through the column.

2. The method of claim 1 wherein said thermoplastic composition is cooled to a temperature wherein the shear storage modulus of the thermoplastic composition is greater than about $1 \times 10^7$ dynes/cm².

3. The method of claim 1 wherein said thermoplastic composition is cooled to a temperature wherein the shear storage modulus is greater than about $1 \times 10^8$ dynes/cm².

4. The method of claim 1 wherein said thermoplastic composition is cooled to a temperature wherein the shear storage modulus is greater than about $1 \times 10^9$ dynes/cm².

5. The method of claim 1 wherein the thermoplastic composition is cooled to a surface temperature of about 0° C. or less.

6. The method of claim 1 wherein said pieces of thermoplastic composition range in size from about 0.5 mm to about 10 mm.

7. A method of continuously packaging a hot melt thermoplastic composition comprising the steps of:
    a) forming a plurality of individual pieces of a molten hot melt thermoplastic composition in a forming device;
    b) dispensing said pieces of hot melt thermoplastic composition into a refrigerant;
    c) retaining said pieces in said refrigerant bath until sufficiently cooled or detackified to form cooled/detackified pieces; and
    d) removing said pieces from said refrigerant; and
    e) then dispensing said pieces into an enclosure.

8. The method of claim 7 wherein said thermoplastic composition is pressure sensitive.

9. The method of claim 7 wherein said refrigerant is a liquid.

10. The method of claim 7 wherein said thermoplastic composition is cooled to a temperature wherein the shear storage modulus is greater than about $1 \times 10^7$ dynes/cm².

11. The method of claim 7 wherein said thermoplastic composition is cooled to a temperature wherein the shear storage modulus is greater than about $1 \times 10^8$ dynes/cm².

12. The method of claim 7 wherein said thermoplastic composition is cooled to a temperature wherein the shear storage modulus is greater than about $1 \times 10^9$ dynes/cm².

13. The method of claim 7 wherein the thermoplastic composition is cooled to a surface temperature of about 0° C. or less.

14. The method of claim 7 wherein said pieces of thermoplastic composition range in size from about 0.5 mm to about 10 mm.

15. A method of continuously packaging a pressure sensitive thermoplastic composition comprising the steps of:
    a) forming a plurality of individual pieces of a molten pressure sensitive thermoplastic composition in a forming device;
    b) dispensing said pieces of pressure sensitive thermoplastic composition into a chamber comprising a cooled surface;
    c) retaining said pieces of pressure sensitive thermoplastic composition in said chamber until the surface of said thermoplastic has reached a temperature such that said surface is sufficiently detackified;
    e) then conveying the pieces of said pressure sensitive thermoplastic composition into an enclosure.

16. The method of claim 15 wherein said thermoplastic composition is cooled to a temperature wherein the shear storage modulus is greater than about $1 \times 10^7$ dynes/cm².

17. The method of claim 15 wherein said thermoplastic composition is cooled to a temperature wherein the shear storage modulus is greater than about $1 \times 10^8$ dynes/cm².

18. The method of claim 15 wherein said thermoplastic composition is cooled to a temperature wherein the shear storage modulus is greater than about $1 \times 10^7$ dynes/cm².

19. The method of claim 15 wherein the thermoplastic composition is cooled to a temperature of about 0° C. or less.

20. The method of claim 15 further comprising a step of forming the piece into smaller pieces.

21. The method of claim 15 wherein in step (d), the pressure sensitive thermoplastic composition is conveyed into an enclosure one at a time.

22. The method of claim 15 wherein in step (d), at least a plurality of pieces of the pressure sensitive thermoplastic composition is conveyed into an enclosure at a time.

* * * * *